(12) United States Patent  
Nakanishi et al.

(10) Patent No.: US 8,945,788 B2  
(45) Date of Patent: Feb. 3, 2015

(54) FUEL CELL SYSTEM

(75) Inventors: Haruyuki Nakanishi, Susono (JP); Hidekazu Arikawa, Susono (JP); Kazuya Uchisasai, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 517 days.

(21) Appl. No.: 12/679,174

(22) PCT Filed: Oct. 17, 2008

(86) PCT No.: PCT/JP2008/068886  
§ 371 (c)(1),  
(2), (4) Date: Jun. 17, 2011

(87) PCT Pub. No.: WO2010/044170  
PCT Pub. Date: Apr. 22, 2010

(65) Prior Publication Data  
US 2011/0236779 A1    Sep. 29, 2011

(51) Int. Cl.  
*H01M 8/04* (2006.01)  
*H01M 16/00* (2006.01)

(52) U.S. Cl.  
CPC ........ *H01M 16/006* (2013.01); *H01M 8/04261* (2013.01); *Y02E 60/50* (2013.01); *H01M 8/04186* (2013.01); *H01M 8/04753* (2013.01); *H01M 8/04223* (2013.01); *H01M 8/0432* (2013.01)  
USPC ........... 429/448; 429/429; 429/446; 429/447; 429/449

(58) Field of Classification Search  
CPC .................... H01M 8/04223; H01M 8/04753; H01M 8/04261  
USPC .......................... 429/429, 446, 447, 448, 449  
See application file for complete search history.

(56) References Cited

U.S. PATENT DOCUMENTS

| | | | |
|---|---|---|---|
| 2003/0162062 A1* | 8/2003 | Hoenig et al. | 429/19 |
| 2004/0121201 A1 | 6/2004 | Roche et al. | |
| 2007/0166601 A1* | 7/2007 | Sano et al. | 429/43 |
| 2008/0085431 A1 | 4/2008 | Kohno et al. | |

FOREIGN PATENT DOCUMENTS

| | | |
|---|---|---|
| JP | 7-249422 | 9/1995 |
| JP | 8-88015 | 4/1996 |
| JP | 2001-28270 | 1/2001 |
| JP | 2001 250573 | 9/2001 |
| JP | 2002-184437 | 6/2002 |
| JP | 2003-17096 | 1/2003 |
| JP | 2003077512 | * 3/2003 |
| JP | 2006 511923 | 4/2006 |
| JP | 2008 16344 | 1/2008 |
| JP | 2008 97838 | 4/2008 |

OTHER PUBLICATIONS

JP 2006-318675—Translation.*  
JP 2003077512—Translation.*  
Office Action issued Aug. 28, 2012 in Japanese Application No. 2010-511412 (With English Translation).

* cited by examiner

*Primary Examiner* — Ladan Mohaddes  
(74) *Attorney, Agent, or Firm* — Oblon, Spivak, McClelland, Maier & Neustadt, L.L.P.

(57) ABSTRACT

A fuel cell system whose fuel loss caused by the crossover of the fuel is small and which can be operated economically. The fuel cell system includes a fuel cell 10, a primary feeding system 12 for feeding a primary fuel which is a liquid fuel to the fuel cell 10, a secondary feeding system 13 for feeding a secondary fuel which is a liquid fuel whose saturation vapor pressure is lower than that of the primary fuel to the fuel cell 10, a ECU 30 for controlling each part so that the primary fuel in the fuel cell is replaced with the secondary fuel when terminating the operation of the fuel cell 10.

6 Claims, 4 Drawing Sheets

FUEL CELL SYSTEM

TECHNICAL FIELD

The present invention relates to a fuel cell system that includes a fuel cell.

BACKGROUND ART

The system (hereinafter referred to as a fuel cell system) that includes polymer electrolyte fuel cell (hereinafter referred simply to as a fuel cell) and mechanisms for feeding a fuel etc. into it comprises the type in which hydrogen is fed to the fuel cell and the type (refer to, e.g., Patent document 2, 4, 5) in which hydrogen generated by reforming town gas, methanol etc. is fed to the fuel cell, as well known. The fuel cell system (refer to, e.g., Patent document 1, 3) in which methanol, ethanol or the like is fed to the fuel cell directly (without being reformed) is also known.

The fuel cell system in which a liquid fuel (methanol etc.) is directly fed to the fuel cell has advantages in that a reformer is not required and the liquid, which can be stored and transported more easily than hydrogen, can be used as the fuel.

However, when the liquid fuel is directly fed to the fuel cell, a phenomenon by which the liquid fuel diffuses into the cathode through the electrolyte film occurs. The phenomenon is normally termed a crossover. The occurrence of the crossover causes useless consumption of the fuel. Further, the oxidation of the fuel that is crossovered into the cathode fuel causes lowering of the output of the fuel cell. Hence, the efforts to develop the electrolyte films in which the crossover does not occur and the catalysts (refer to, e.g., Patent document 1) that does not oxidize the crossovered fuel are made.

[Patent document 1] Japanese Patent Laid-Open Publication No. 2008-016344
[Patent document 2] Japanese Patent Laid-Open Publication No. 2006-511923
[Patent document 3] Japanese Patent Laid-Open Publication No. 2008-097838
[Patent document 4] Japanese Patent Laid-Open Publication No. 2001-250573
[Patent document 5] Japanese Patent Laid-Open Publication No. 2003-017096

DISCLOSURE OF THE INVENTION

It is possible to prevent that the output lowers due to the crossover by improving the catalyst of the cathode side. However, by improving the catalyst, it is impossible that the crossover does not occur at all. Therefore, the technique that can reduce the fuel loss owning to the crossover economically (in such a form which the running costs does not rise) is demanded.

Further, the existing fuel cell system is the one having disadvantages in that it takes time to activate (especially, at low temperature) and the output (electric power that the system generates) cannot be changed greatly. Therefore, the fuel cell system that does not have such disadvantages is also demanded.

It is a first object of the present invention to provide a fuel cell system whose fuel loss caused by the crossover of the fuel is small and which can be operated economically.

It is a second object of the present invention to provide a fuel cell system that can be used as a system whose fuel loss caused by the crossover of the fuel is small, a system the output of which can be changed greatly, etc.

To accomplish the above first objects, according to a first aspect of the present invention, a fuel cell system comprises a fuel cell for generating electricity through an electrochemical reaction between a liquid fuel and an oxidant being fed, and a fuel cell controller for feeding a first liquid fuel to the fuel cell to make the fuel cell operate, the fuel cell controller, when terminating operation of the fuel cell, feeds a second liquid fuel saturation vapor pressure of which is lower than that of the first liquid fuel to the fuel cell, thereby replacing the first liquid fuel in the fuel cell with the second liquid fuel.

That is, in a case where the liquid fuel that evaporates easily (that has high saturation vapor pressure) remains in the deactivated fuel cell, since the crossovered liquid fuel in the cathode side evaporates relatively quickly, the crossover occurs indefinitely. Contrarily, in a case where the liquid fuel that does not evaporate easily (that has low saturation vapor pressure) remains in the deactivated fuel cell, since the crossovered liquid fuel in the cathode side does not evaporate quickly, a layer of the liquid fuel is formed on the cathode side of the electrolyte film. As a result, the fuel cell enters the state where the further crossover will not occur. Therefore, in order that the crossover does not occur at all, it is considered that the liquid fuel which does not evaporate easily is desirable. However, such liquid fuel is more expensive than the liquid fuel (ethanol, methanol, etc.) which evaporates easily.

And, if employed is a configuration that the inexpensive first liquid fuel (the first liquid fuel whose saturation vapor pressure is lower than that of the second liquid fuel) is used as the fuel normally and the first liquid fuel in the fuel cell is replaced with the second liquid fuel having higher saturation vapor pressure, it is possible to prevent that the fuels (the first liquid fuel and the second liquid fuel) are uselessly consumed by the crossover in a way that the running costs (costs for the power generation) does not rise. Hence, the configuration above is employed to the fuel cell system according to the present invention.

The fuel cell system according to the first aspect of the present invention may be configured using either the fuel cell containing the cation exchange film as the electrolyte film or the fuel cell containing the anion exchange film as the electrolyte film. However, the crossover amount through the anion exchange film is smaller than that of through the cation exchange film. And, in a case where the anion exchange film is used as the electrolyte film, a catalyst (a non-Platinum catalyst) which does not oxidize the crossovered fuel can be used at the cathode side. Therefore, in actualizing the fuel cell system of the present invention, it is desirable to use the fuel cell each electrolyte film of which is an anion exchange film.

Moreover, any fuel saturation vapor pressure of which is higher than that of the first fuel can be used as the second liquid fuel (which the fuel cell controller feeds to the fuel cell) of the fuel cell system according to the first aspect of the present invention. However, if a substance which does not freeze easily, for instance, ethylene glycol, is used as the second fuel, it is possible to prevent the fuel cell from freezing.

Further, as the fuel cell controller, a controller which feeds the first liquid fuel to the fuel cell from beginning when being started, a controller, when initiating operation of the fuel cell, makes the fuel cell operate by feeding the second liquid fuel to the fuel cell, and subsequently replaces the first liquid fuel in the fuel cell with the second liquid fuel, etc. can be used. However, in a case where the second fuel is the one which causes higher output of the fuel cell than the first fuel does, it is desirable to use the latter controller, because use of the latter controller in said case results in the fuel cell system wherein the output voltage of the fuel cell quickly rises to the required voltage when the system is started.

Note that, if the feeding time of the second fuel in starting the system is excessively long, the average costs for electric power generation will rise. Moreover, if the feeding time of the first fuel is fixed, there is the danger that switching to the second fuel is performed at the temperature at which the first liquid fuel freezes in the fuel cell etc. Consequently, it is desirable to use, as the fuel cell controller, the controller that replaces liquid fuel in the fuel cell with the second liquid fuel when the temperature of the fuel cell becomes higher than or equal to a prescribed temperature.

A fuel cell system according to a second aspect of the present invention comprises a fuel cell for generating electricity through an electrochemical reaction in itself between a liquid fuel and an oxidant being fed, and a fuel cell controller capable of feeding plural kinds of fuels to the fuel cell, the fuel cell controller selects one fuel which corresponds to status of the fuel cell from the plural kinds of fuels and feeds the fuel to the fuel cell.

That is, the fuel cell system according to the second aspect of the present invention has an architecture that switches the fuels to be fed into the fuel cell dynamically based on the status of the fuel cell. Therefore, if the first liquid fuel and the second liquid fuel mentioned above are used as "plural kinds of fuels", and a controller which, when deactivating the fuel cell (when the fuel cell enters the status where the fuel cell must be deactivated), feeds the second liquid fuel to the fuel cell is used as "the fuel cell controller", the fuel cell system functions as system whose fuel loss caused by the crossover of the fuel is small and which can be operated economically. Further, if two or more fuels each causes different output when being fed to the fuel cell are used as "plural kinds of fuels", and a controller which selects one fuel appropriate for current status and feeds it to the fuel cell is used as "the fuel cell controller", the fuel cell system functions as a system which can raise the output greatly as the need arises.

Still further, if two (or more) fuels having different melting points (freezabilty) are used as "plural kinds of fuels", and a controller which feeds the fuel having lower (or lowest) melting point when activating the fuel cell (when being started) is used as "the fuel cell controller", the fuel cell system functions as a system that hardly causes the problem when being activated at low temperature (the system that can be started at the temperature at which the conventional system can hardly be started). Further, if a fuel with extremely low volatility (ignitability) is used as one of "plural kinds of fuels" and a controller which feeds said fuel to the fuel cell when the status of the fuel cell changes into the abnormal one is used as "the fuel cell controller", the fuel cell system functions as a system which can respond to the abnormality of the fuel cell without terminating the power generation operation.

Naturally, by employing all (or some) configurations described above, the fuel cell system exhibiting all (or sum) effects described above can be configured.

Figure 1:
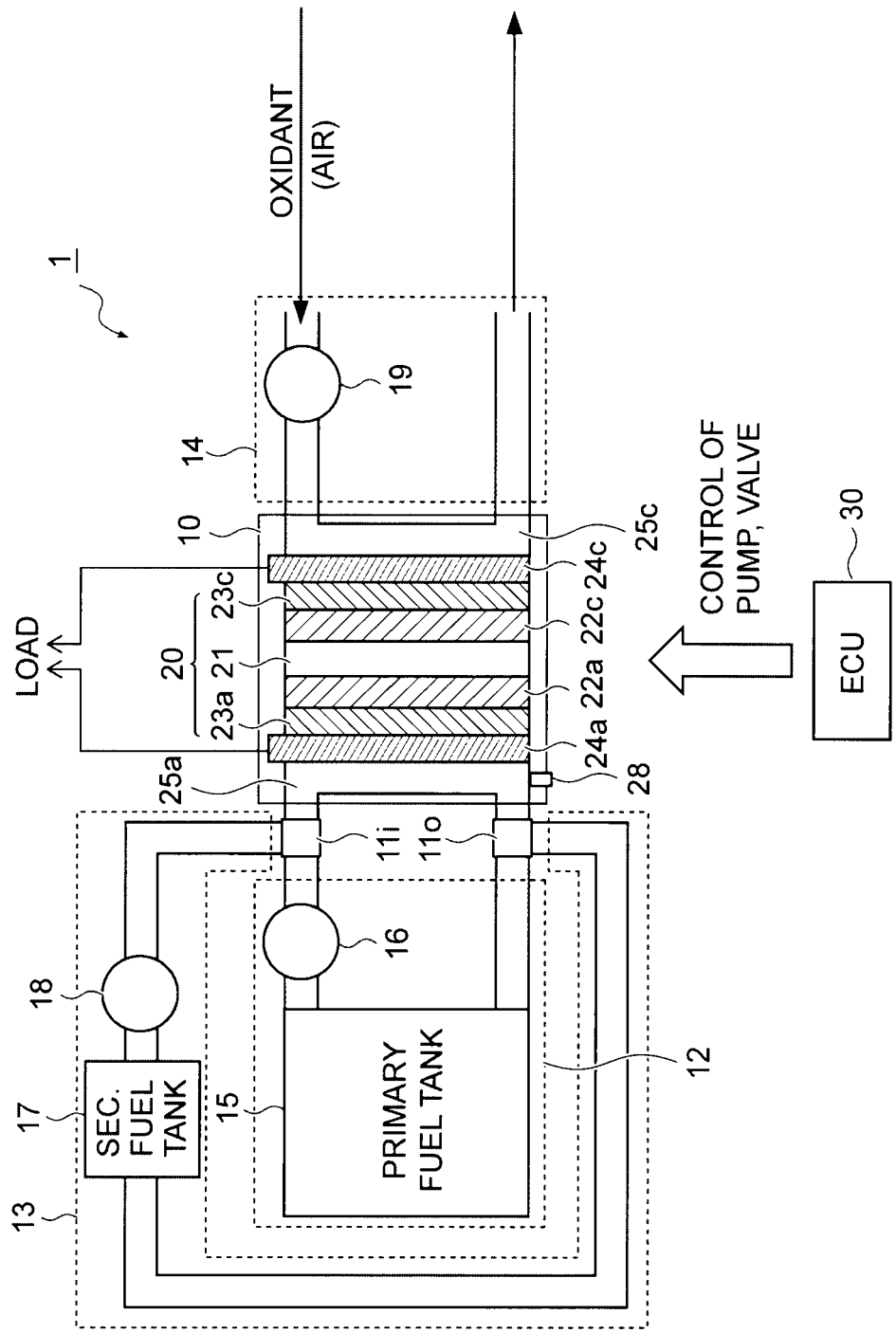
FIG. 1 is a block diagram showing the general configuration of a fuel cell system 1 according to a first embodiment of the present invention.

| EXPLANATION OF REFERENCE NUMERALS | |
|---|---|
| 1 | fuel cell system |
| 10 | fuel cell |
| 11i, 11o | switching valve |
| 12 | primary fuel feeding system |
| 13 | secondary fuel feeding system |
| 14 | oxidant feeding system |
| 15 | primary fuel tank |
| 16 | primary fuel pump |
| 17 | secondary fuel tank |
| 18 | secondary fuel pump |
| 19 | air pump |
| 20 | MEA |
| 21 | anion exchange film |
| 22a | anode-side catalyst layer |
| 22c | cathode-side catalyst layer |
| 23a | anode-side diffusion layer |
| 23c | cathode-side diffusion layer |
| 24a | anode-side collector plate |
| 24c | cathode-side collector plate |
| 25a | fuel flow pass |
| 25c | air flow pass |
| 28 | temperature sensor |
| 30 | ECU |

DESCRIPTION OF THE PREFERRED EMBODIMENT

The following is a detailed description with reference to the drawings of embodiments of the present invention.
<First Embodiment>
FIG. 1 is a block diagram showing the general configuration of a fuel cell system 1 according to a first embodiment of the present invention. Note that, the fuel cell system 1 of this embodiment is the one that is developed as a power system for a fuel cell vehicle. To be more specific, the fuel cell system 1 is the one developed as a system for supplying electric power to the portion ("LOAD" in FIG. 1) of the fuel cell vehicle, which consists of a DC-DC converter, an inverter, a battery, an electric motor for propulsion, etc.

As shown in the Figure, the fuel cell system 1 includes a fuel cell 10, a primary fuel feeding system 12, a secondary fuel feeding system 13, oxidant feeding system 14, an ECU 30, etc.

The fuel cell 10 is a fuel cell which includes an MEA (Membrane Electrode Assembly) 20 that is an anion exchange film 21 with an anode-side catalyst layer 22a and an anode-side diffusion layer 23a on one side, and a cathode-side catalyst layer 22c and a cathode-side diffusion layer 23c on the other side. On the anode side (the anode-side diffusion layer 23a side) of the MEA 20, an anode-side collector plate 24a and a fuel pass 25a are arranged. On the cathode side (the cathode-side diffusion layer 23c side) of the MEA 20, a cathode-side collector plate 24c and an air flow pass 25c are arranged.

Note that, though only one MEA 20 is illustrated in FIG. 1, the actual fuel cell 10 includes a plurality of MEAs 20, fuel flow passes 25a, air flow passes 25c and the like. To be more specific, the actual fuel cell system 10 is a stack of a plurality of MEAs 20 and a plurality of members (so-called bipolar plates) each acts as the anode-side collector plate 24a, the cathode-side collector plate 24c, the fuel flow pass 25a and the air flow pass 25c.

The anode-side catalyst layer 22 included in the MEA 20 of the fuel cell 10 is the one having a catalyst with low methanol oxidation activity. Further, the fuel cell 10 is the one provided with a fuel inlet and a fuel outlet connected to every fuel flow passes 25a, and an air inlet and an air outlet connected to every air flow passes 25c.

To the fuel cell 10, a temperature sensor 28 for measuring the temperature of the fuel cell 10 is fixed. To the fuel inlet of the fuel cell 10, a switching valve 11i (which will be explained in detail later on) is fixed. Moreover, a switching valve 11o (which will be explained in detail later on) is fixed to the fuel outlet of the fuel cell 10.

The primary feeding system 12 connected to the fuel cell 10 through the switching valves 11i and 11o is a system that consists of a primary fuel tank 15 for reserving a primary fuel defined as a relatively inexpensive liquid fuel (ethanol in this embodiment), a primary fuel pump 16 for feeding the primary fuel within the primary fuel tank 15 to the fuel cell 10, pipes for connecting various parts, etc. Incidentally, though not illustrated, on intermediate portions of a pipe arranged between the switching valve 11o and the primary fuel tank 15 in the primary fuel feeding system 12, a gas-liquid separator for separating $CO_2$ from a discharged fuel (a mixture of fuel, $CO_2$ and water) and an ethanol-water separator for separating water from the discharged fuel are installed.

The secondary feeding system 13 connected to the fuel cell 10 through the switching valves 11i and 11o is a system that consists of a secondary fuel tank 17 for reserving a secondary fuel (ethylene glycol in this embodiment) defined as a liquid fuel the saturation vapor pressure of which is lower than that of the primary fuel, a secondary fuel pump 18 for feeding the secondary fuel within the secondary fuel tank 17 to the fuel cell 10, pipes for connecting various parts, etc. The secondary feeding system 13 is, as with the primary feeding system 12, a system having a gas-liquid separator and an ethanol-water separator (not shown) installed on intermediate portions of a pipe arranged between the switching valve 11o and the secondary fuel tank 17.

Figure 2:
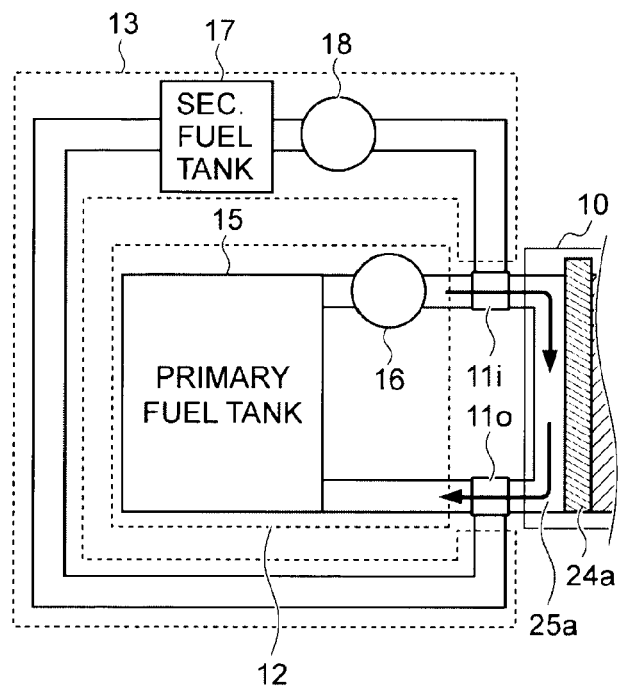
FIG. 2 is an explanatory diagram showing statuses of two switching valves in the fuel cell system according to the first embodiment.
Figure 3:
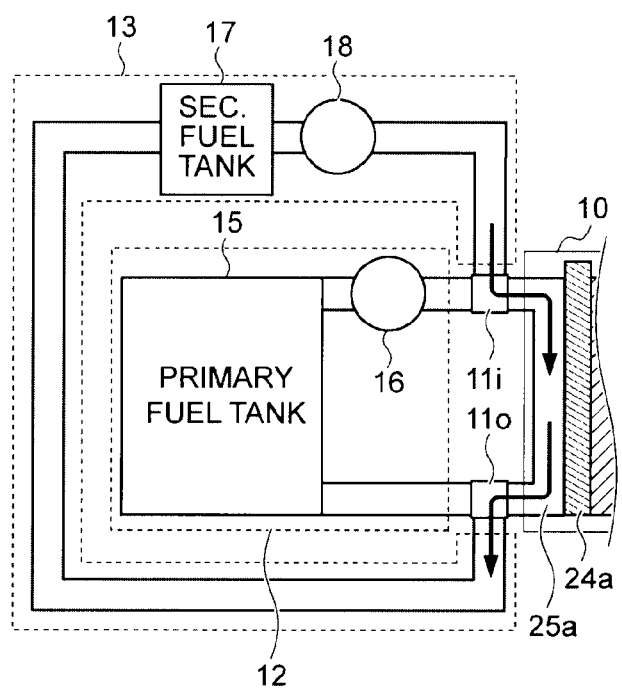
FIG. 3 is an explanatory diagram showing other statuses of two switching valves in the fuel cell system according to the first embodiment.

And, as schematically shown in FIGS. 2 and 3, each of the switching valves 11i and 11o is a three way valve (solenoid valve in this embodiment) which can connect either the primary feeding system 12 or the secondary feeding system 13 to the fuel cell 10.

The oxidant feeding system 14 (FIG. 1) is a system consisting of an air pump 19 (a so-called air compressor) for feeding air to the fuel cell 10, pipes, etc. As already explained, the fuel cell 10 is the one in which the anion exchange films 21 are used (the fuel cell which needs feeding of water into the cathodes), hence, on intermediate portions of a pipe connected to the air inlet of the fuel cell 10, a mixer (not shown) for adding moisture to air from the air pump 19 is installed.

ECU (Electronic Control Unit) 30 is a unit that controls, based on the outputs of various sensors (accelerator pedal sensor etc.) in a system-mounted-vehicle, each part (the primary fuel pump 16, the switching valves 11i and 11o, etc.) of the fuel cell system 1 so that the fuel cell 10 generates desired electric power. Herein, the system-mounted-vehicle is defined as the fuel cell vehicle in which the fuel cell system 1 has been mounted. Incidentally, the ECU 30 is a unit which runs on the electric power from the buttery (one element of "LOAD" in FIG. 1) of the system-mounted-vehicle.

Figure 4:
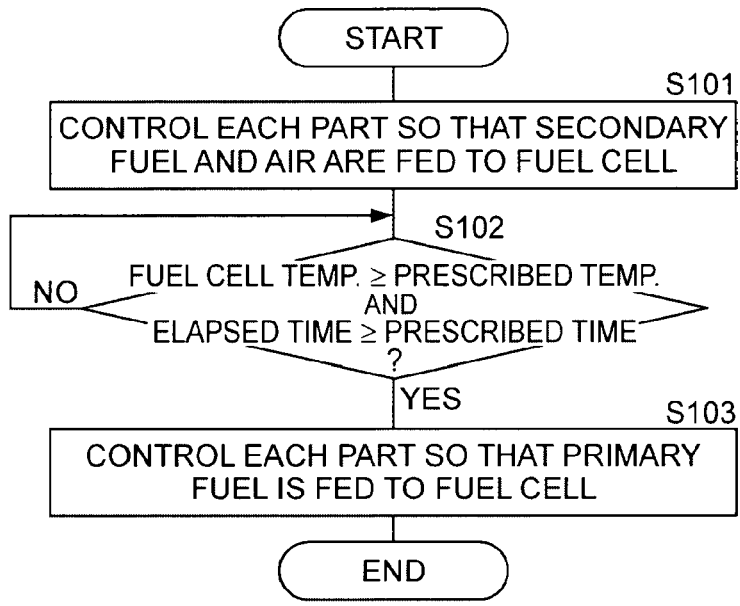
FIG. 4 is a flowchart showing entire operating steps of the starting process executed by ECU in the fuel cell system according to the first embodiment.

This ECU 30 is configured (programmed) as a unit that performs the starting process whose procedures are shown in FIG. 4 when initiating the power generation operation of the fuel cell 10 ("when the ignition switch of the system-mounted-vehicle is turned on" in this embodiment).

That is, when initiating the power generation operation of the fuel cell 10, the ECU 30 controls each part so that the secondary fuel and the air (humidified air) are fed to the fuel cell 10 (step S101). In other words, ECU 30 controls the switching valves 11i and 11o so that the secondary fuel is fed to the fuel cell 10 (see FIG. 3) and controls the secondary pump 18 and the air pump 19 so as to start operation.

Afterward, the ECU 30 starts a process (step S102) of monitoring satisfaction of "the fuel cell temperature≥the prescribed temperature and the elapsed time≥the prescribed time". Herein, the fuel cell temperature is defined as the temperature of the fuel cell 10 (the temperature detected by the temperature sensor 28) and the elapsed time is the time elapsed after starting the process of step S102. The prescribed temperature and the prescribed time are numerical values (temperature, time) determined in advance. These numerical values are determined so that switching of the fuels will be performed at appropriate timing (which will be explained in detail later on).

If "the fuel cell temperature≥the prescribed temperature and the elapsed time≥the prescribed time" is satisfied (step S102; YES), the ECU 30 controls each part so that the primary fuel is fed to the fuel cell 10 (step S103). That is, at this step S103, the ECU 30 controls the switching valves 11i and 11o so that the primary fuel is fed to the fuel cell 10 (see FIG. 2). Further, the ECU 30 performs a control for terminating operation of the secondary fuel pump 18 and for initiating operation of the primary fuel pump 16.

Then, the ECU 30, which performed such control, terminates this starting process (process of FIG. 4) and starts a usual control process.

Figure 5:
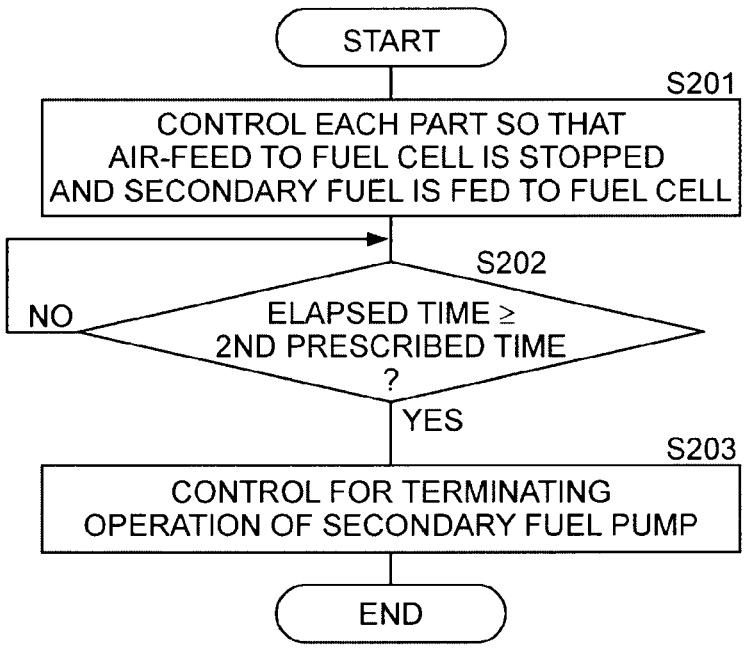
FIG. 5 is a flowchart showing entire operating steps of the terminating process executed by ECU in the fuel cell system according to the first embodiment.

Further, the ECU 30 is configured as a unit that performs a terminating process whose procedures are shown in FIG. 5 when terminating the power generation operation of the fuel cell 10 ("when the ignition switch of the system-mounted-vehicle is turned off" in this embodiment).

That is, when terminating the power generation operation of the fuel cell 10, the ECU 30, to begin with, controls each part so that feeding of air to the fuel cell 10 is stopped and the secondary fuel is fed to the fuel cell 10 (step S201). Specifically, the ECU 30 performs a control for terminating the operations of the primary fuel pump 16 and the air pump 19, a control for changing the states of the switching valves 11i and 11o into the states illustrated in FIG. 3, and a control for initiating the operation of the secondary fuel pump 17.

Then, ECU 30 starts a process (step S202) of waiting until the second prescribed time is elapsed. Herein, the second prescribed time is the time that is predetermined as the time required for replacing the primary fuel in the fuel cell 10 by the secondary fuel.

If the second prescribed time is elapsed (step S202; YES), the ECU 30 performs a control for terminating operation of the secondary fuel pump 18 (step S203). Then, the ECU 30 terminates this terminating process and enters the stopped state.

As apparent from the explanation given above, the fuel cell system 1 according to the first embodiment of the present invention is configured as a system in which relatively inexpensive ethanol (the primary fuel) is fed to the fuel cell basically, and the ethanol remained in the fuel cell 10 is replaced with the ethylene glycol (the secondary fuel) which does not evaporate so easily as the ethanol (the saturation vapor pressure of which is lower than that of the ethanol) when deactivating the fuel cell 10.

Accordingly, the fuel cell system 1 of the present embodiment functions as a system whose fuel loss caused by the crossover of the fuels (ethanol and ethylene glycol) is smaller than that of the existing fuel cell system in which only ethanol is used as the fuel (denoted hereinafter as to the conventional system). Further, the fuel cell system 1 is the one that can be used at the running costs equivalent to that of the conventional system.

Specifically, a case where the ethanol remains within the deactivated fuel cell 10 and a case where the ethylene glycol remains within the deactivated fuel cell 10 are considered. In the former case, because the ethanol is a substance that evaporates easily, the crossovered ethanol in the cathodes evaporates relatively quickly. Namely, in this case, the fuel cell 10 keeps the condition where the difference between the fuel concentration in the cathode (s) and the fuel concentration in the anode(s) is large, consequently, the crossover occurs indefinitely.

Figure 6:
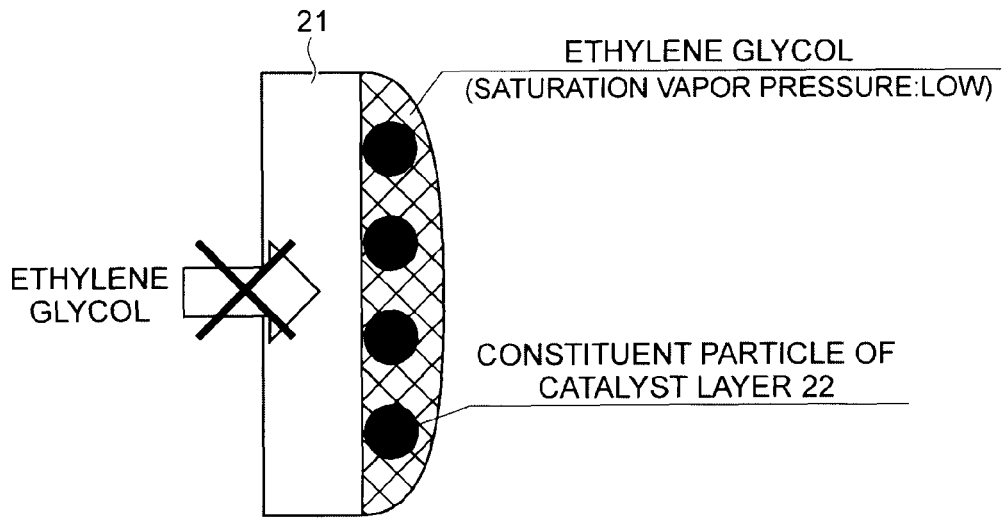
FIG. 6 is an explanatory diagram showing status of the deactivated fuel cell in the fuel cell system according to the first embodiment.

In the latter case, the crossover occurs for a while. However, because the evaporation rate of the ethylene glycol is low, after a certain quantity of the ethylene glycol has diffused through the cation exchange layer 21, the status of the fuel cell 10 changes, as schematically illustrated in FIG. 6, into the status where the cathode side of the cation exchange layer 22 is covered with the ethylene glycol, i.e. the status where the further crossover will not occur.

Accordingly, the fuel cell system 1 that replaces the ethanol remaining in the fuel cell 10 with the ethylene glycol when deactivating the fuel cell 10 is the system whose fuel loss due to the crossover while the fuel cell 10 (the system) is deactivated is smaller than that of the conventional system.

Further, the ethylene glycol is a substance that is more costly than the ethanol, but the fuel cell system 1 is configured as the system that usually makes the fuel cell 10 function with the ethanol. And, as discussed above, the fuel cell system 1 is the system whose ethanol loss caused by the crossover is small (the system whose running costs of the ethanol are reduced because the ethanol is prevented from being uselessly consumed). Accordingly, the fuel cell system 1 is the system that requires relatively expensive ethylene glycol, but can be used at the running costs equivalent to that of the conventional system.

Still further, the fuel cell system 1 is configured as the system that makes the fuel cell 10 perform the power generation operation with the ethylene glycol when activating the fuel cell 10 (see FIG. 4). And, the ethylene glycol is a fuel which causes higher output voltage of the fuel cell 10 than the ethanol does, hence, the fuel cell system 1 is the system wherein the output voltage of the fuel cell 10 quickly rises to the required voltage when the system (the fuel cell 10) is activated.

Moreover, since the ethylene glycol is the substance that does not freeze easily, the fuel cell system 1 is the system that hardly causes the problem when being started at low temperature (the system that can be started even at the temperature at which the conventional system can hardly be started).

Finally, the reason why the configuration that the fuel to be fed into the fuel cell 10 is switched from the ethylene glycol to the ethanol when "the fuel cell temperature≥the prescribed temperature and the elapsed time≥the prescribed time" is satisfied is employed will be explained.

As discussed above, use of the ethylene glycol for the power generation operation of the fuel cell 10 enables the output voltage of the fuel cell 10 to rise quickly. However, if the feeding time of the ethylene glycol is excessively long, the running costs of fuel cell system 1 will rise. Moreover, if the feeding time of the ethylene glycol is fixed, there is the danger that switching to the ethanol is performed at the temperature at which the ethanol freezes in the fuel cell 10, the pipes, etc. Further, it is desirable that the output voltage of the fuel cell always (even when activated in the status where the temperature of the fuel cell 10 is relatively high) rises quickly.

And, use of "the fuel cell temperature≥the prescribed temperature" with the prescribed temperature having the value appropriately determined makes possible to limit the feeding time of the ethylene glycol so as not to be excessively long. It also makes possible to prevent that the problem occurs when switching the fuels. Further, use of "the elapsed time≥the prescribed time" with the prescribed time having the value appropriately determined enables the output voltage of the fuel cell to rise quickly even when the temperature of the fuel cell 10 is relatively high. Therefore, the values of the prescribed temperature and the prescribed time are determined appropriately and the configuration that the fuel to be fed into the fuel cell 10 is switched from the ethylene glycol to the ethanol when "the fuel cell temperature≥the prescribed temperature and the elapsed time≥the prescribed time" is satisfied is employed.

<Second Embodiment>

A fuel cell system according to a second embodiment of the present invention is a system obtained by modifying the fuel cell system 1 according to the first embodiment so that the ECU 30 performs controls somewhat different from the controls discussed above. Therefore, the following discussion employs the same numerals as those used for the description of the fuel cell system 1 of the first embodiment, and will be focused on the controlling operation of the ECU 30 in the fuel cell system 1 of the second embodiment.

The ECU 30 (denoted hereinafter as the second ECU 30) in the fuel cell system 1 according to the second embodiment is also a unit that performs a starting process (see FIG. 4) and a terminating process (see FIG. 5) having the same content as the processes discussed above.

Figure 7:
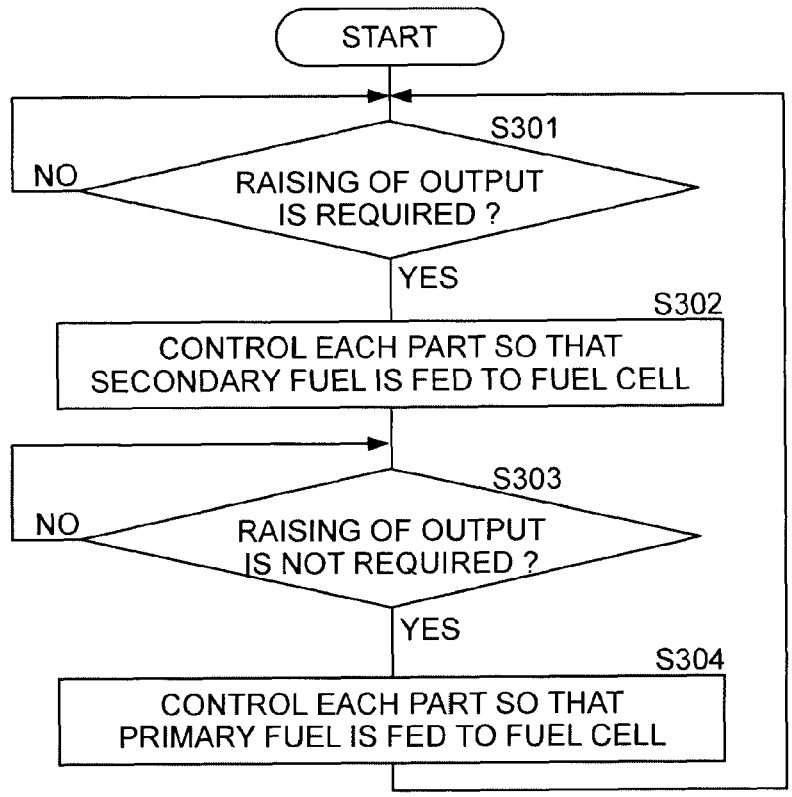
FIG. 7 is a flowchart showing entire operating steps of the normal controlling process executed by ECU in the fuel cell system according to the second embodiment of the present invention.

However, the second ECU 30 is configured (programmed) so that starts a usual control process whose procedure is shown in FIG. 7 when the starting process is finished.

That is, after finishing the starting process, the 2nd CPU 30 starts, together with a process (not shown) of controlling the fuel cell 10 so as to generate the desired electric power, a process (step S301) of monitoring that the status of the self-system is changed to the status that raising the output of the fuel cell 10 is required (monitoring that the target status of the fuel cell 10 turns into the status that high electric power is required).

If the output of the fuel cell 10 has to be raised (step S301; YES), the second ECU 30 controls each part so that the secondary fuel is fed to the fuel cell 10 (step S301). Note that, in this case, the air pump 19 has already been activated. Therefore, controls performed by the 2nd ECU 30 at this step S301 are a control for terminating the operation of the primary fuel cell 16, a control for changing the states of the switching valves 11i and 11o into the states illustrated in FIG. 3, and a control for initiating the operation of the secondary fuel pump 17.

Afterward, the second ECU 30 starts a process (step S303) of monitoring that the status of the self-system is changed to the status that keeping the output of the fuel cell 10 high is not required (the status that the output of the fuel cell 10 may be lowered to the normal level).

If keeping the output of the fuel cell 10 high is not required (step S303; YES), the second ECU 30 controls each part so that the primary fuel is fed to the fuel cell 10 (step S304), and then starts processes from step S301 onwards again.

In short, the second ECU 30 is configured as the unit that makes the fuel cell 10 performs the power generation operation by feeding the secondary fuel (the ethylene glycol which causes the fuel cell 10 to output higher voltage than the ethanol does.) to it when the output of the self-system (the fuel cell 10) has to be raised. Accordingly, the use of the fuel cell system 1 provided with the second ECU 30 makes it possible to raise the output (electric power supplied to the load) greatly as the need arises.

<Modified Examples>

The fuel cell system 1 according to each embodiment can be modified in a variety of forms. For instance, although the fuel cell system 1 according to each embodiment is the system in which the ethanol and the ethylene glycol are used as the primary fuel and the secondary fuel respectively, the fuel cell system 1 may be modified to a system in which other substances are used as the primary and secondary fuels.

However, the ethylene glycol is the substance the saturated vapor pressure of which is particularly lower than those of the general alcohols as shown in the following Table. In addition, the ethylene glycol is the substance that is hard to freeze up and causes the high output voltage of the fuel cell 10. Hence, it is desirable that the ethylene glycol is used as the secondary fuel.

TABLE 1

| Substance Name | Saturation Vapor Pressure |
| --- | --- |
| ethylene glycol | 0.0007 kPa |
| ethanol | 5.878 kPa |
| methanol | 12.3 kPa |
| 1-propanol | 2.0 kPa |
| 2-propanol | 4.4 kPa |

Further, it is feasible to modify the fuel cell system 1 according to each embodiment into a system provided with the fuel cell 10 in which cation exchange film(s) is (are) used as the electrolyte layer(s). However, the crossover amount through the cation exchange layer is much higher than that through the anion exchange layer, and, as the catalyst of the cation exchange film (=strong acidic electrolyte film), because it must be the one resistant to corrosion, the platinum catalyst that oxidizes alcohol must be used. Consequently, it is desirable that the fuel cell in which the anion exchange layer 21 is adopted as each electrolyte layer is used as the fuel cell 10.

It is also possible to modify the fuel cell system 1 according to each embodiment into a system that switches the fuels fed to the fuel cell 10 for a purpose different from "reducing the fuel loss caused by the fuel crossover". Specifically, the fuel cell system 1 according to the first embodiment may be modified into a system that switches the fuels in order to improve startability at low temperature (a system which is provided with a fuel having a low melting point and a fuel for normal operation, and feeds the former fuel to the fuel cell 10 when being activated).

Moreover, the fuel cell system 1 according to the second embodiment may be modified into a system in which the starting process and the stopping process are not performed (a system in which switchover from one fuel to another fuel is performed only in order to raise the output temporarily).

Further, the fuel cell system 1 according to the second embodiment may be modified into a system which includes a fuel with extremely low volatility (ignitability) and a fuel for normal operation, and in which the former fuel is fed to the fuel cell 10 when the status of the fuel cell 10 changes into the abnormal status. Note that, such modification enables the fuel cell system 1 according to the second embodiment to function as a system that can respond to the abnormality of the fuel cell 10 without terminating the power generation operation.

Still further, the fuel cell system 1 according to the second embodiment may be modified into a system which includes many fuels (a fuel for a case where high output is required, a fuel for cold start, a fuel for a case where the fuel cell 10 enters in abnormal state, a fuel for normal operation, a fuel for reducing the fuel loss caused by crossover, etc.) and selects one fuel and feeds it to the fuel cell 10 based on the actual situation of the self-system.

INDUSTRIAL APPLICABILITY

The invention is related to the fuel cell system that makes the fuel cell generate electricity, and is available as various system/apparatus that require electric power.

The invention claimed is:

1. A fuel cell system comprising:
a fuel cell for generating electricity through an electrochemical reaction between a liquid fuel and an oxidant being fed;
a first fuel pump that feeds a first substance as a first liquid fuel to said fuel cell; a second fuel pump that feeds a second substance with saturation vapor pressure which is lower than that of the first substance as a second liquid fuel to said fuel cell, the second liquid fuel diffusing into a cathode of the fuel cell less than the first liquid fuel; and
an electronic control unit programmed to control the first fuel pump to feed the first liquid fuel to said fuel cell to make said fuel cell operate, said electronic control unit further programmed, when terminating operation of said fuel cell, to terminate an operation of the first fuel pump and to initiate an operation of the second fuel pump to feed the second liquid fuel to said fuel cell, in order to replace the first liquid fuel in said fuel cell with the second liquid fuel so that the fuel cell contains the second liquid fuel and a crossover effect of the second liquid fuel during deactivation of the fuel cell is less than a crossover effect of the first liquid fuel,
wherein said fuel cell is configured to generate electricity with the second liquid fuel when re-activated.

2. The fuel cell system according to claim 1, wherein said electronic control unit is programmed, when initiating operation of said fuel cell, to make said fuel cell operate by feeding the second liquid fuel to said fuel cell, and to replace subsequently the first liquid fuel in said fuel cell with the second liquid fuel.

3. The fuel cell system according to claim 2, wherein said electronic control unit is programmed to replace liquid fuel in said fuel cell with the second liquid fuel when the temperature of said fuel cell becomes higher than or equal to a prescribed temperature.

4. The fuel cell system according to one of claim 1, wherein the second liquid fuel is ethylene glycol.

5. The fuel cell system according to one of claim 1, wherein each electrolyte film used in said fuel cell is an anion exchange film.

6. The fuel cell system according to one of claim 1, wherein the second liquid fuel freezes at a lower temperature than the first liquid fuel.

* * * * *